United States Patent [19]

Kress et al.

[11] 3,940,094
[45] Feb. 24, 1976

[54] WING SWEEP CONTROL SYSTEM

[75] Inventors: Robert W. Kress, Lloyd Harbor; Martin C. Stettler, Stony Brook, both of N.Y.

[73] Assignee: Grumman Aerospace Corporation, Bethpage, N.Y.

[22] Filed: Oct. 30, 1974

[21] Appl. No.: 519,279

[52] U.S. Cl. ........... 244/77 D; 244/42 A; 244/77 M; 244/77 SE
[51] Int. Cl.² ........................................ B64C 13/18
[58] Field of Search ...... 235/150.2; 244/42 A, 42 D, 244/46, 49, 77 D, 77 R, 77 M, 77 SE, 78

[56] References Cited
UNITED STATES PATENTS

| | | | |
|---|---|---|---|
| 2,428,934 | 10/1947 | Gille et al. | 244/46 |
| 2,448,167 | 8/1948 | Baak | 244/42 A |
| 2,736,515 | 2/1956 | Dolan et al. | 244/49 |
| 2,924,400 | 2/1960 | Ruget | 244/46 |
| 2,936,134 | 5/1960 | Miller et al. | 244/77 SE |
| 3,027,878 | 4/1962 | Keyt et al. | 244/78 X |
| 3,044,002 | 7/1962 | Lejohn | 244/77 SE X |
| 3,064,928 | 11/1962 | Toll | 244/46 |
| 3,171,615 | 3/1965 | Patterson | 244/77 SE |
| 3,252,675 | 5/1966 | Close et al. | 244/77 M |
| 3,447,761 | 6/1969 | Whitener et al. | 244/46 X |
| 3,501,114 | 3/1970 | DePlante | 244/46 |
| 3,522,729 | 8/1970 | Miller | 244/77 D X |

FOREIGN PATENTS OR APPLICATIONS

| | | | |
|---|---|---|---|
| 566,334 | 8/1957 | Italy | 244/46 |

Primary Examiner—Trygve M. Blix
Assistant Examiner—Stephen G. Kunin
Attorney, Agent, or Firm—Morgan, Finnegan, Pine, Foley & Lee

[57] ABSTRACT

A system for controlling the wing sweep angle of the wings of an aircraft over their entire sweep range, including a detector for determining aircraft speed and altitude, a digital computer for receiving signals from the detector to produce output signals in response to the input signals therefrom, control apparatus responsive to signals from the computer, an actuator for moving the wings of the aircraft in response to the control apparatus, and a cross-shaft for synchronizing the movement of the wings. A manual controller is also included for manual control of the actuator.

30 Claims, 9 Drawing Figures

WING SWEEP CONTROL SYSTEM

The invention herein described was made in the course of or under a contract or subcontract thereunder with the Department of the Navy.

The present invention relates to aircraft control systems, and more specifically to an aircraft control system for controlling the wing sweep angle of the wings of an aircraft over their entire sweep range.

Various systems for adjusting the position of the wings or flight control surfaces of aircraft are known in the art, see Gille et al. U.S. Pat. No. 2,428,934; Baak U.S. Pat. No. 2,448,167; Ruget U.S. Pat. No. 2,924,400; Toll U.S. Pat. No. 3,064,928; and De Plante U.S. Pat. No. 3,501,114.

Gille et al. discloses a mechanical system that employs pressure to automatically vary the position of the wings, and includes means for manually controlling the wings when automatic control is undesirable. Such a system requires a relatively long response time and would be inadequate for optimizing combat performance when flying at Mach speeds.

Ruget discloses an auxiliary surface, which may be automatically controlled, to change the focus of an aircraft to improve maneuverability and stability of the aircraft.

Baak discloses a system for controlling the position of the landing flaps of an aircraft in response to air speed conditions. De Plante discloses a mechanical jack device for controlling wing movement. Toll discloses a pivot arrangement for controlling the tip sections of the wings of an aircraft.

It is an object of the present invention to provide a system for controlling the wing sweep angle of the wings of an aircraft over their entire sweep range to optimize combat maneuverability and performance.

It is a further object of the present invention to provide a wing sweep control system which allows for a reduction in the structural weight of the aircraft and improved performance while ensuring structural safety within the flight envelope.

It is a further object of the present invention to provide a wing sweep control system which reduces level flight and turning drag.

It is a still further object of the present invention to provide a wing sweep control system which relieves the pilot of the burden of trying to manually select the optimum wing sweep angle under adverse conditions, e.g., combat.

Other objects, aspects, and advantages of the present invention will be apparent when the detailed description is considered with the accompanying drawing.

Briefly, the wing sweep control system of the present invention includes detector means for determining aircraft speed and altitude, a digital computer for receiving signals from the detector means to produce output signals in response to the input signals therefrom, control means responsive to signals from the computer, actuator means for moving the wings of the aircraft in response to the control means, and means for synchronizing the movement of the wings. Means is also included for manual control of the actuator means.

The present invention is illustrated in the accompanying drawings in which.

Figure 1:
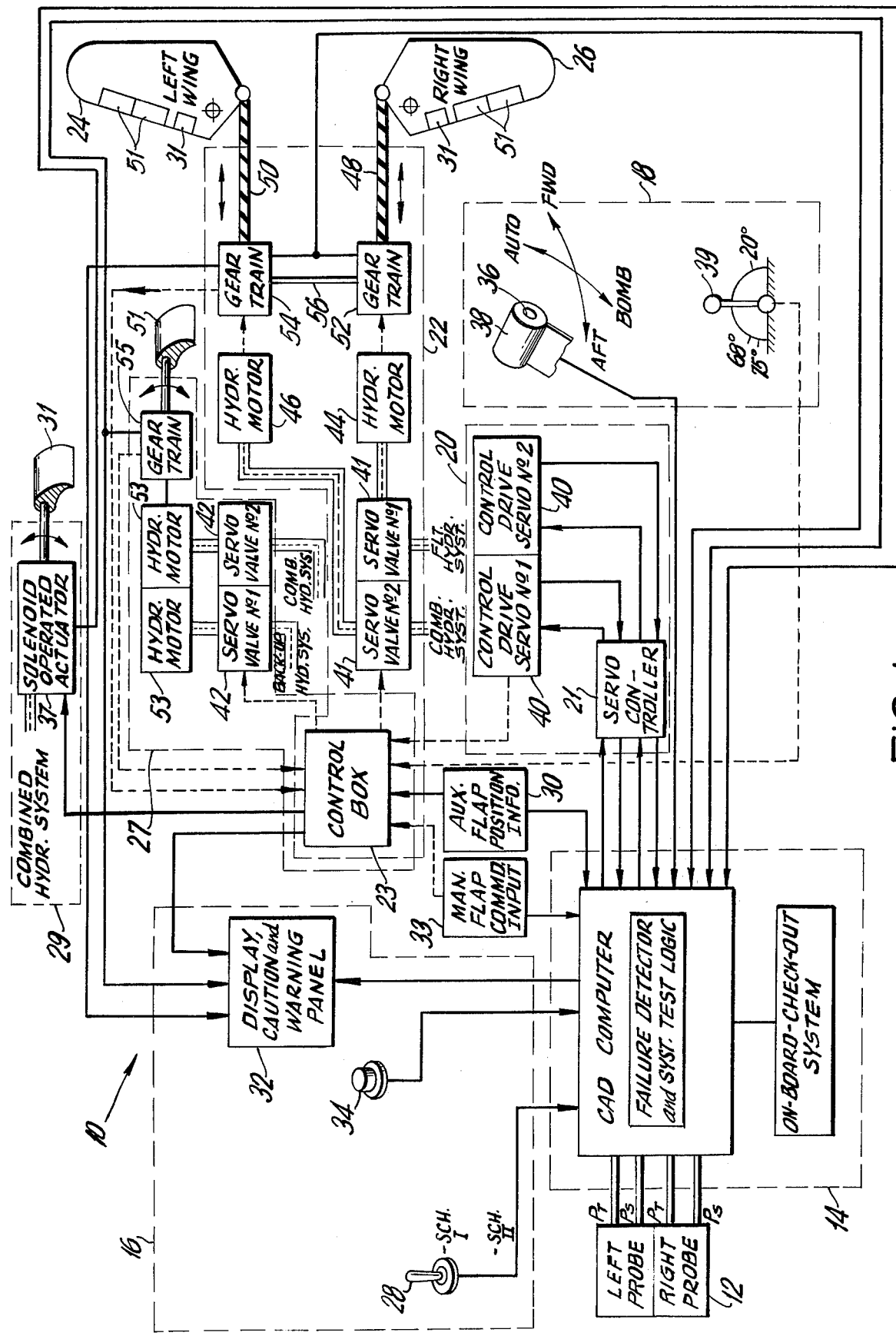
FIG. 1 is a block diagram showing the wing sweep control system.

Referring to FIG. 1, the wing sweep system generally indicated at 10 includes pitot static means 12 located in the nose of the aircraft, a central air data computer 14 located in the equipment bay of the aircraft, display and activating means 16 and mode control means 18 located in the cockpit of the aircraft, and drive control means 20 and wing sweep actuation means 22 located above the wing-carry-through-structure of the aircraft.

The central air data computer 14 may be a Garrett Central Air Data digital computer which is programmed to provide wing sweep output control signals in response to input signals from the pitot static means 12. The flow chart for the algorithm to be used with the computer 14 is illustrated in FIGS. 5A–5E. An actual program in source or machine language may be readily constructed from this flow chart by one skilled in the art of programming. One example of an actual program print-out in the assembly machine language is attached hereto as Appendix A. The computer 14, as well as most of the other components of the system 10 are dually redundant to provide a substantially failsafe system.

The computer 14 supplies output signals to the drive control means 20 which activates the wing sweep actuator means 22 to cause the wings 24 and 26 to assume the proper wing sweep angle for the speed and altitude of the aircraft. The wing sweep angle may vary from a most forward position of about 20° (take-off and landing) to an aft position of about 68° relative to a transverse plane perpendicular to the longitudinal axis of the aircraft. Further, with oversweep the aft position of the wings may be further extended to about 75°.

The wing sweep system 10 includes four basic modes of operation illustrated in FIG. 4, as follows:

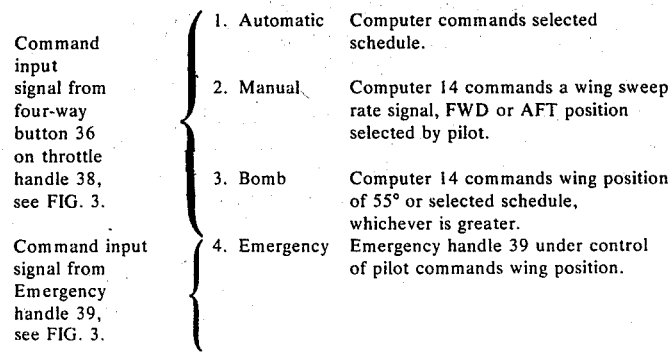

Figure 3:
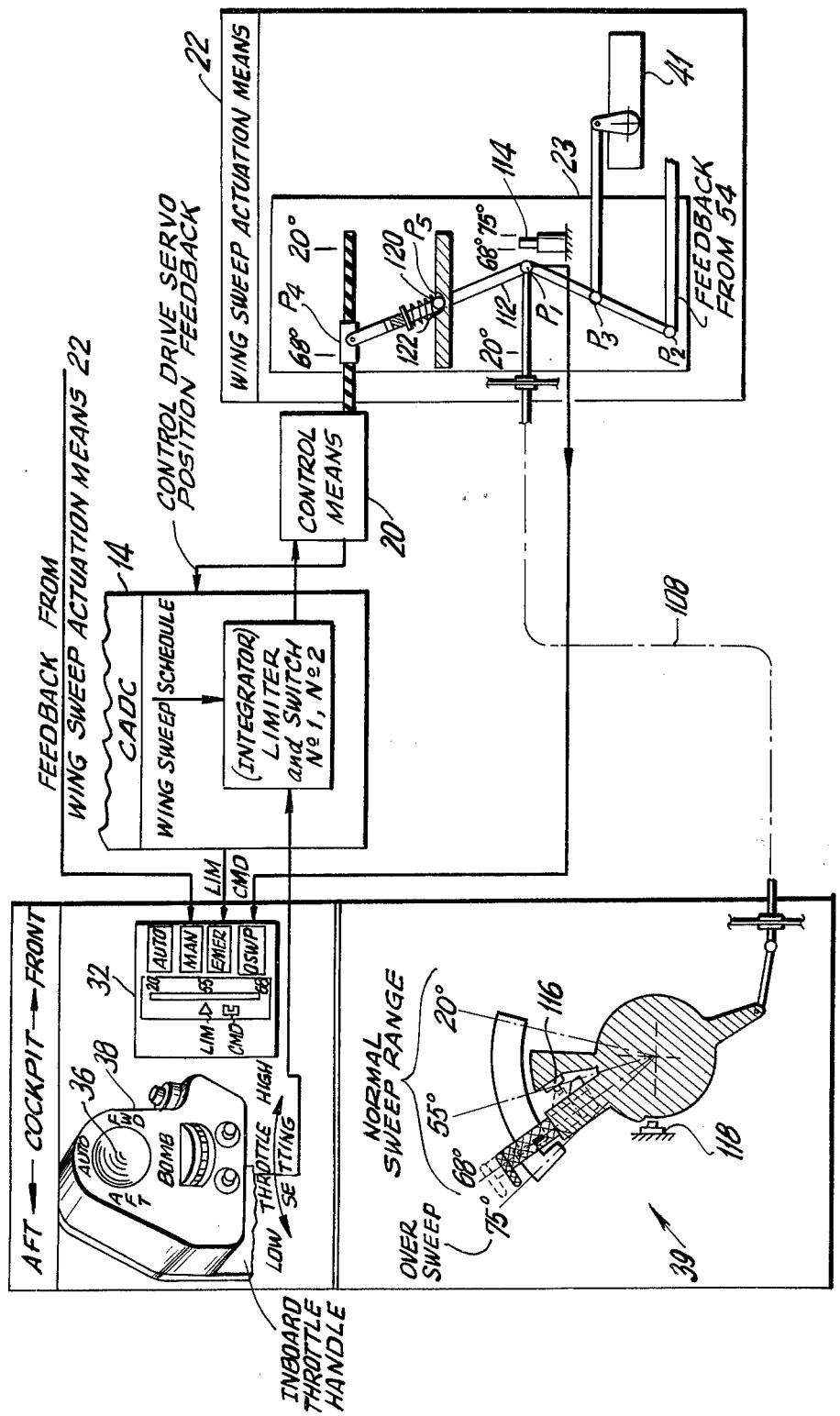
FIG. 3 is a schematic diagram of the fly-by-wire and mechanical override system.

| | | |
|---|---|---|
| Command input signal from four-way button 36 on throttle handle 38, see FIG. 3. | 1. Automatic | Computer commands selected schedule. |
| | 2. Manual | Computer 14 commands a wing sweep rate signal, FWD or AFT position selected by pilot. |
| | 3. Bomb | Computer 14 commands wing position of 55° or selected schedule, whichever is greater. |
| Command input signal from Emergency handle 39, see FIG. 3. | 4. Emergency | Emergency handle 39 under control of pilot commands wing position. |

The automatic mode of operation includes two wing sweep position schedules. The first schedule (Sch. I) provides for high g-pull capability with or without a change in speed considerations, e.g., during climbing. The second schedule (Schedule II) provides for high acceleration capability at low g-levels, e.g., during level flight. The desired schedule is chosen by manually positioning the schedule switch 28, as desired.

Conventional monitoring means 32, shown as a display, caution, and warning panel, monitors the operation of the computer 14, the drive control means 20, the wing sweep actuation means 22, and maneuver flap control means 27 to provide the pilot with a visual indication of malfunction in any of these components of the system 10. A reset button 34 is also included for use when a malfunction in the computer 14 is indicated by the monitoring means 32.

The manual mode of operation is electronically interlocked with the automatic mode of operation so that switching from the manual to the automatic mode, but not the reverse, is achieved automatically. The interlocking of the manual and automatic modes will be discussed in more detail with reference to FIGS. 2 and 4.

The bomb mode of operation causes the computer 14 to provide a constant wing sweep position of 55° until the point of intersection with the schedule. At that point, for higher speeds, the bomb mode follows the schedule, see FIG. 4.

The emergency mode of operation enables the pilot to bypass the computer 14 and directly activate the wing sweep actuation means 22 with emergency handle 39 to select any inflight position of between about 20° and about 68°, see FIG. 3. Further, for pre-flight on ground testing, a more aft wing position of about 75° (oversweep) may be selected.

The mode of operation, with the exception of the emergency mode, is determined by activating the four-way wing sweep control button 36 of the fly-by-wire system (FBW), see FIG. 3. The FBW system provides electronic control for all such selected modes of operation, replacing mechanical push-pull rods for pilot command transmission to the control surface actuation means.

For ease of wing sweep control during combat conditions, the four-way control button 36 may be advantageously mounted on the throttle handle 38. A discrete signal dependent upon the mode of operation selected by the pilot is transmitted from the button 36 to the computer 14, which provides either a position or a rate command according to the mode selected. The output signals from the computer 14 drive the control means 20 which provides the proper input signal to the wing sweep actuation means 22. The control means 20 includes a redundant servo controller 21 and a redundant control drive servo 40. The control means 20 transforms an electrical command from the computer 14 to a mechanical (rotary) command to a control box 23.

The wing sweep actuation means 22 includes the control box 23, redundant servo valve 41, and hydraulic motors 44 and 46 mechanically coupled to high efficiency screw jacks 48 and 50 respectively, through integral gear trains 52 and 54. Each gear train 52 and 54 includes a no-back device which permits the wings 24 and 26 to maintain a fixed wing position under maximum load during hydraulic power failure. The left wing 24 is driven by the portside hydraulic system ("combined" hydraulic system) while the right wing 26 is driven by the starboard hydraulic system ("flight" hydraulic system). Synchronization of the wing movement is achieved by a cross-shaft 56 mechanically coupled to the gear trains 52 and 54. In the event of failure of one of the hydraulic motors 44 or 46, the operative servo valve 41 and hydraulic motor 44 or 46 is capable of driving both gear trains 52 and 54 at reduced speed. The computer 14 receives position feedback by way of a transducer (not shown) sensitive to the rotation of the gear trains 52 and 54.

The combined hydraulic system is interlocked with the wing sweep actuation means 22, the maneuver flap control means 27, governing the motion of the pair of outboard maneuver flaps 51 on each wing 24 and 26, and the auxiliary flap control means 29, governing the motion of the single inboard flap 31 on each wing 24 and 26. An electrical and mechanical interlock, in the computer 14 and control box 23, respectively, between the flap means 27 and 29, and wing sweep actuation means 22 ensures that there is no structural interference of the flaps 51 and 31 with the fuselage.

The maneuver flaps 51 are positioned according to command input 33 which activates the control box 23 to move the dually redundant servo valve 42. Output signals from the servo valve 42 activate a dually redundant hydraulic motor 53 which drives a gear train 55 mechanically coupled to the maneuver flaps 51.

The auxiliary flaps 31 are positioned according to command input 30 which activates the control box 23 to actuate a solenoid actuator 37 to move the flap 31 on each wing 24 and 26.

The control box 23, more fully explained below with reference to FIG. 3, is a conventional rotary mechanical device for summing signals for the wing sweep actuation means 22 and maneuver flap control means 27, i.e., it adds the position input commands to provide an output to the servo valves 41 and 42.

Figure 2:
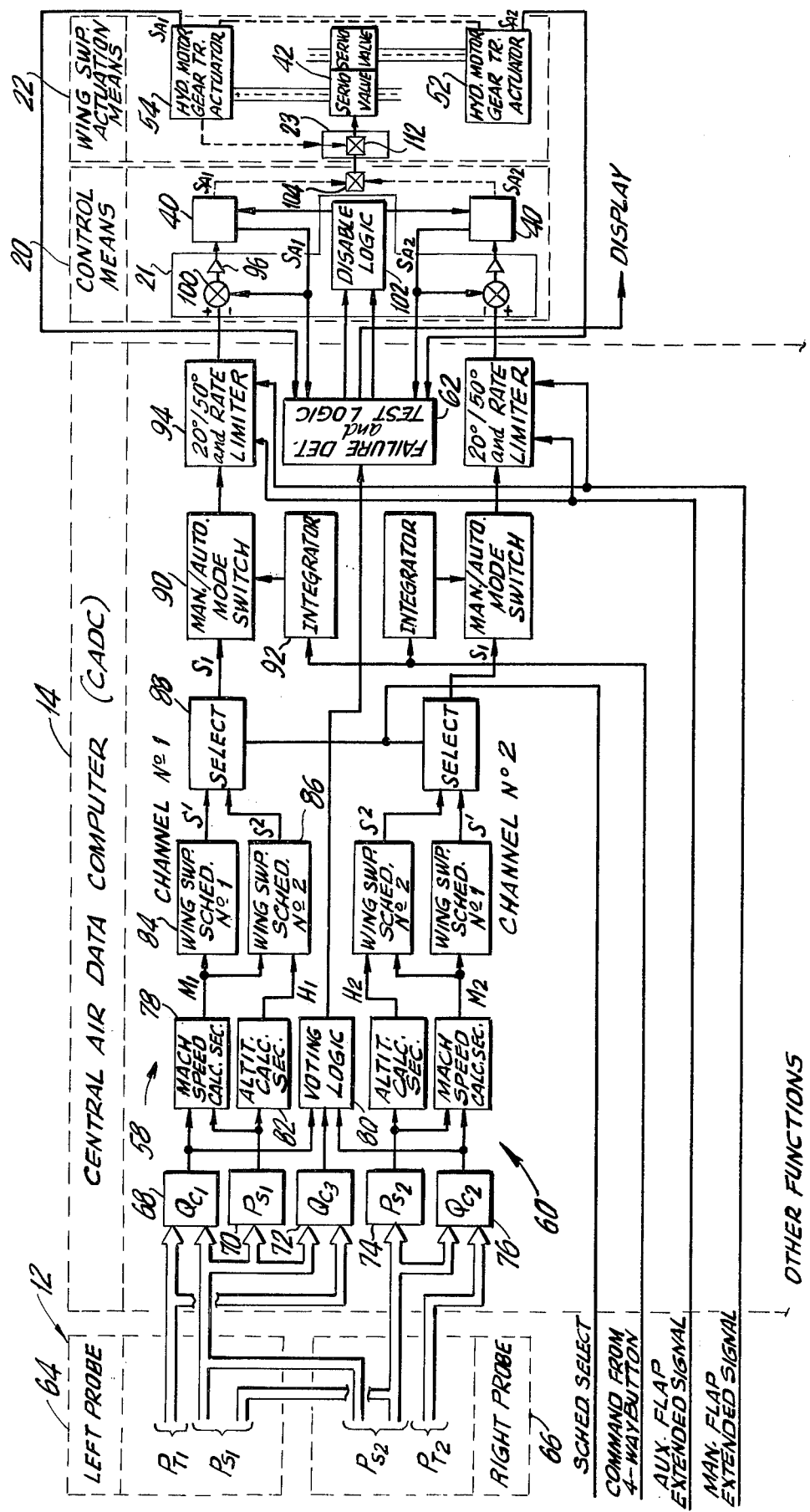
FIG. 2 is a detailed block diagram of the pitot static system, central air data computer, control drive servos, control box, and wing sweep actuation system of FIG. 1.

Referring also to FIG. 2, the computer 14 receives electrical and pneumatic signals to provide data to a number of avionic systems aboard the aircraft. The operation of the computer 14 in the system 10 of the present invention is represented functionally by the blocks shown in FIG. 2. The dually redundant computer 14 includes two channels 58 and 60 for automatically switching from channel 1 to channel 2 if there is a malfunction in one of the channels. Further, logic circuitry 62 is electrically connected to the monitoring means 32 to warn the pilot of failure in the system 10.

Pneumatic input signals to computer 14 are provided by the pitot static means 12 which includes a left probe 64 and a right probe 66. The pitot static probes 64 and 66 are of conventional design and supply inputs to pressure transducers 68, 70, 72, 74 and 76 which convert the signals from the probes 64 and 66 into electrical signals for use by the computer 14. $Q_{c1}$, $Q_{c2}$, and $Q_{c3}$ are dynamic pressure transducers. $P_{s1}$ and $P_{s2}$ are static pressure transducers. $Q_c = P_t - P_s$.

Since the function of the first and second channels 58 and 60 is identical, only the operation of the first channel 58 and the components shared by channels 1 and 2 will be described. The output signals from transducer 68 ($Q_{c1}$) provide the input signals to a Mach speed calculating section 78 and voting logic circuitry 80 of the computer 14. The output signals from the transducer 70 ($P_{s1}$) are fed to the Mach speed calculating section 78 and an altitude calculating section 82. The output signals from transducer 72 ($Q_{c3}$) provide another input to the voting logic circuitry 80. The output from the voting logic circuitry 80 provides one input to detect and test logic circuitry 62.

The output from the Mach speed calculating section 78 is applied to a first wing sweep schedule section 84 and a second wing sweep schedule section 86, either of which may be selected, as desired. The output signal from the altitude calculating section 82 is applied to the second wing sweep schedule section 86. The output signals from the sections 84 and 86 are applied to logic select circuitry 88 which also receives an input signal from the schedule switch 28, see FIG. 1. The output signal from the logic select circuitry 88 provides one input to a manual or automatic mode switch 90. Another input to the switch 90 is provided by a command signal from the four-way button 36. The command signal from the button 36 is integrated by integrator 92 prior to being applied to the mode switch 90 to convert the command signal which is proportional to speed to an input signal proportional to position. The output from the mode switch 90 provides one input to conventional position and position rate limiting circuitry 94. Input signals from the maneuver flap control means 27 and the auxiliary flap control means 29 are also applied to the position and position rate limiting circuitry 94. The position and position rate limiting circuitry 94 produces the wing sweep command output signal which activates the control drive servo 40.

An input to the limiting circuitry 94 from the maneuver flap control means 27, indicating that the maneuver flaps are extended, sets the upper limit of the sweep angle at 50°. An input signal to the limiting circuitry 94 from the auxiliary flap control means 29, indicating that the auxiliary flaps are extended, sets the lower limit of the sweep angle at 20°. The output signals from the position and position rate limiting circuitry 94 are applied to the servo controller 21 which includes dually redundant components for use with the first and second channels 58 and 60 of the computer 14. Only the components used with the first channel 58 and those shared by both channels will be described.

The servo controller 21 includes an amplifier 96. An electrical output signal from the control drive servo 40 is used to establish a feedback loop therewith. Its input and output signals being summed at junction 100, to accurately control the mechanical output of the control drive servo 40. Further, the electrical output signal from the control drive servo 40 is also coupled to logic circuitry 62. The output signals from the logic circuitry 62 provide inputs to activate logic circuitry 102 in the control means 20 for disabling the control drive servo 40.

Each mechanical output from the control drive servos 40 is coupled to a differential gear means 104 which provides the position command input to the wing sweep actuation means 22. This input enters the control box 23 and the wing position is limited by conventional mechanical limiters to 20° if the auxiliary flaps are deflected, or to 50° if only the maneuver flaps 51 are deflected. The input command is then summed in the control linkage 112, see FIG. 3, with the position feedback of the left wing gear train 54, generating the output of the control box 23.

The mechanical output from the control box 23 drives dually redundant servo valves 41 to activate hydraulic motors 44 and 46, gear trains 52 and 54, and screw jacks 48 and 50 of the wing sweep actuator means 22 to properly position the wings 24 and 26. The output from the gear trains 52 and 54 is sensed by transducers (not shown) and fed back to the logic circuitry 62 for failure detection and wing position indication in the monitoring means 32.

Referring to FIG. 3, actuation of the four way button 36 provides discrete signals which will activate either the automatic, bomb, or manual wing sweep mode within the computer 14. In the automatic and manual modes the wing sweep angle may vary between about 20° and about 68°. In the bomb mode the wing sweep angle may vary between about 55° and about 68°. Further, in the emergency mode an emergency handle 39 is provided to enable the pilot to bypass the selected computer schedule and manually select any wing position between about 20° and about 68°, as well as 75° (oversweep). The motion of the emergency handle 39 is transmitted to a control cable 108 which in turn moves a control linkage 112 in the control box 23.

The control linkage 112 sums the wing position command at $P_1$ with the wing position feedback at $P_2$, generating at output at $P_3$ which moves the servo valve 41. Additionally, the control linkage 112 synchronizes the position of the emergency handle 39 (point $P_1$ on the control linkage 112) with the command of the control means (point $P_4$). Synchronization is obtained when a spring loaded ball 120 engages a spider detent 122 at $P_5$. The control linkage 112 then pivots about $P_5$ and the emergency handle 39 ($P_1$) moves in parallel with $P_4$. This condition occurs during normal wing sweep modes, i.e., bomb, automatic, and manual. Since the control means 20 cannot be moved by the wing sweep actuation means 22 (no back driving), $P_4$ cannot be moved by the emergency handle 39. However, if sufficient force is applied to the emergency handle 39 during the emergency mode of operation, the spring loaded ball 120 jumps out of the spider detent 122, placing the emergency handle 39 in sole command of the wing sweep actuation means 22.

A normally extended solenoid 114 positioned in the control box 23 provides an upper limit of 68° for the wing position command signal. The wing position command signal is sensed by a transducer (not shown) at point $P_3$ in the control box 23 and transmitted to the monitoring means 32. Signals from the computer 14 indicating the mode of operation and sweep angle limit are also supplied to the monitoring means 32.

The emergency handle 39 is also used to provide an oversweep position command. Oversweep is utilized for dense aircraft carrier deck parking and for preflight on ground testing of the control drive servo 40 of the system 10. An oversweep condition is attained only if the solenoid 114 in control box 23 is energized so that it retracts to remove the maximum wing position command limit at 68°. The solenoid 114 is energized when the following conditions are met:

1. There is weight on the wheels of the aircraft; and
2. The emergency handle 39 is in the raised position (dotted outline in FIG. 3) to close a switch 116 which initiates restriction of the horizontal tail position to prevent structural interference between the tail and the wings 24 and 26.

When the emergency handle 39 is moved into the oversweep position (75°), a switch 118 is closed providing a discrete signal to the computer 14 to enable preflight testing of the system 10.

Figure 4:
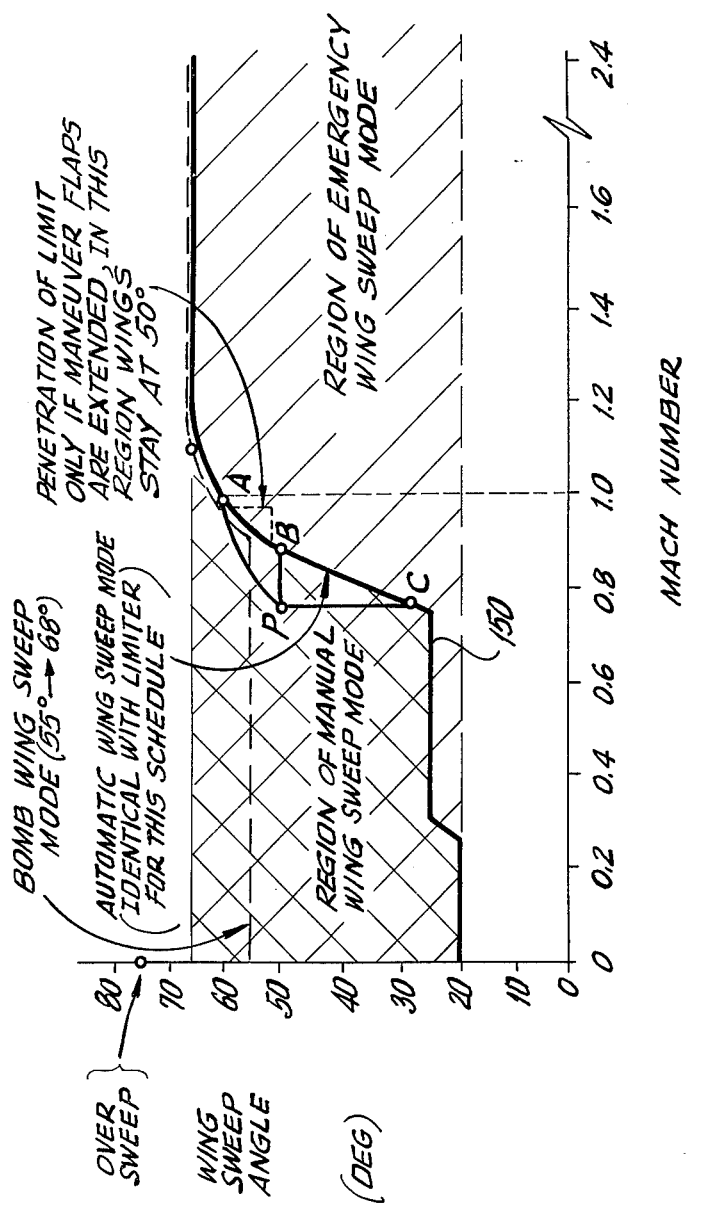
FIG. 4 is a graph in which wing sweep angle is plotted against Mach number showing the various modes of operation of the wing sweep control system.
Figure 5A:
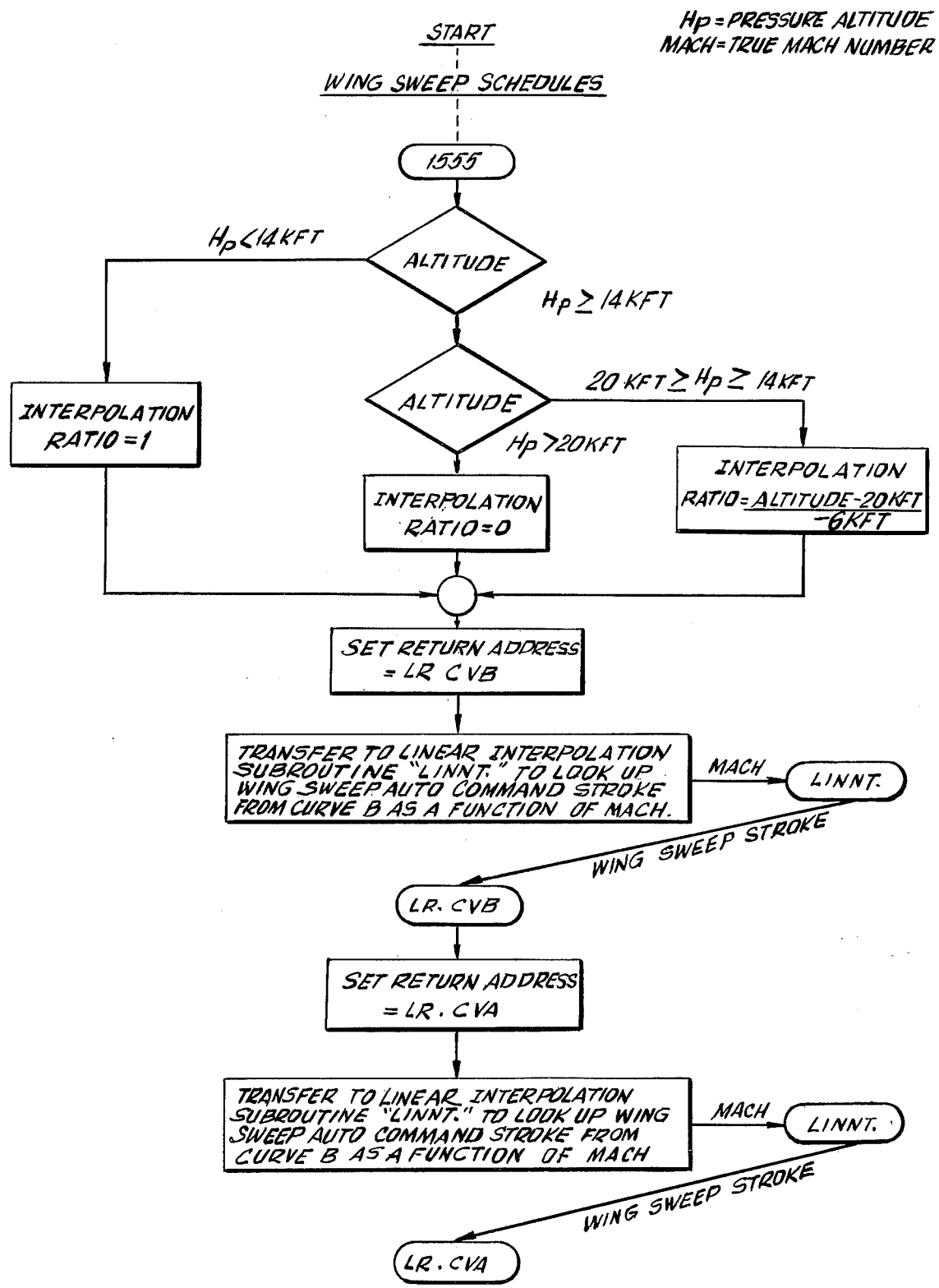
FIGS. 5A–E comprises a flow chart of an algorithm for use with the central air data computer of the wing sweep control system.
Figure 5B:
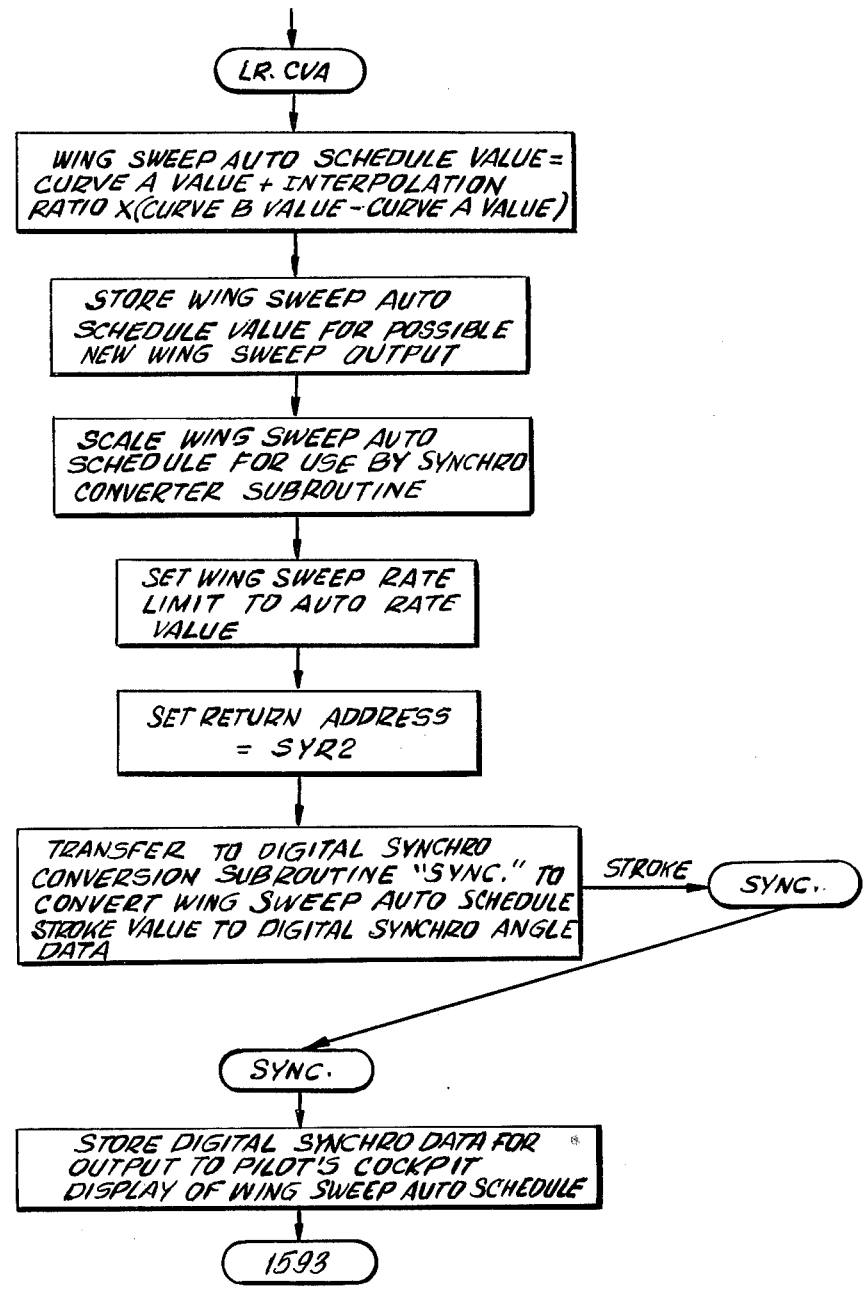
Figure 5C:
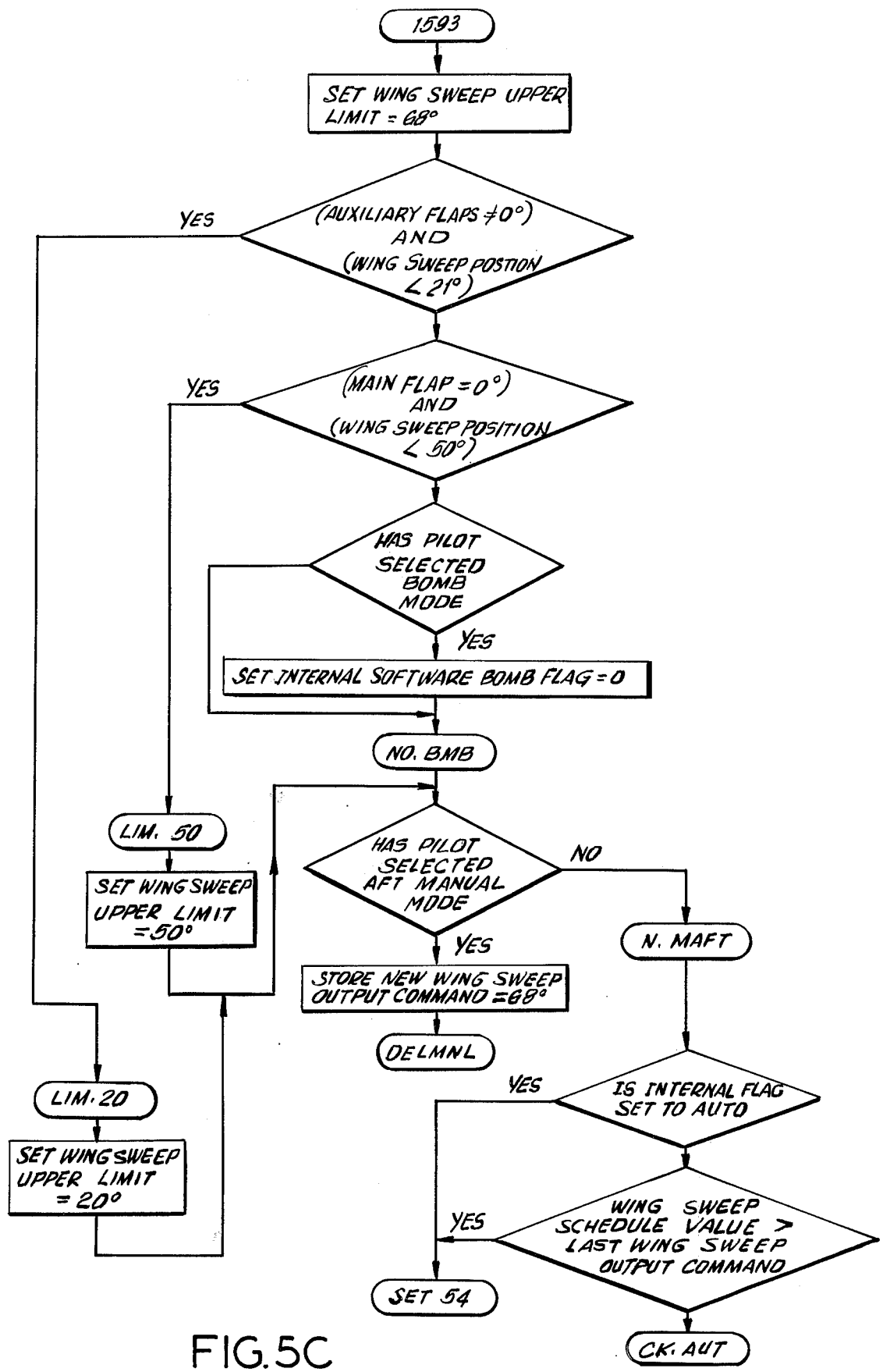
Figure 5D:
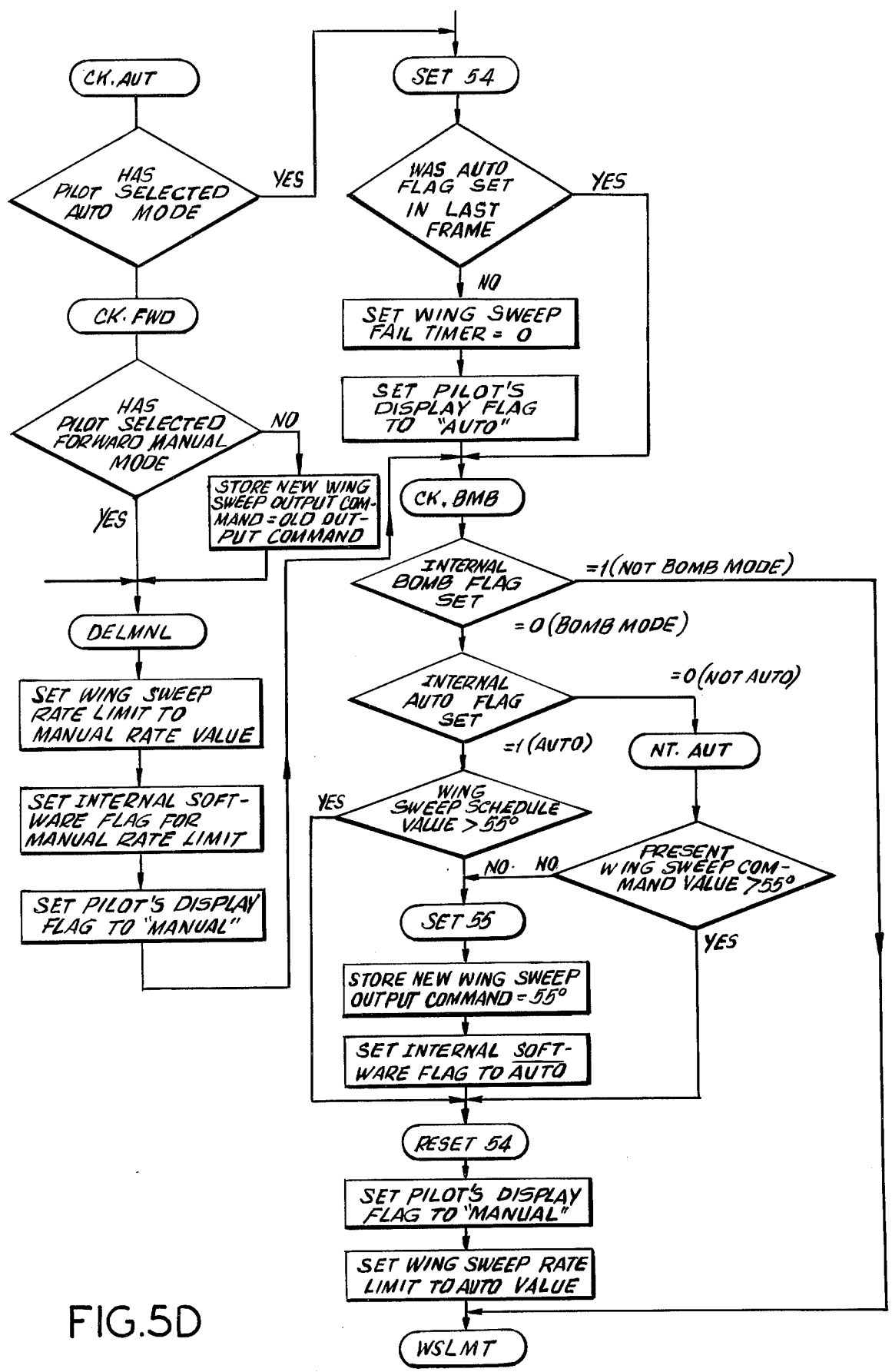
Figure 5E:
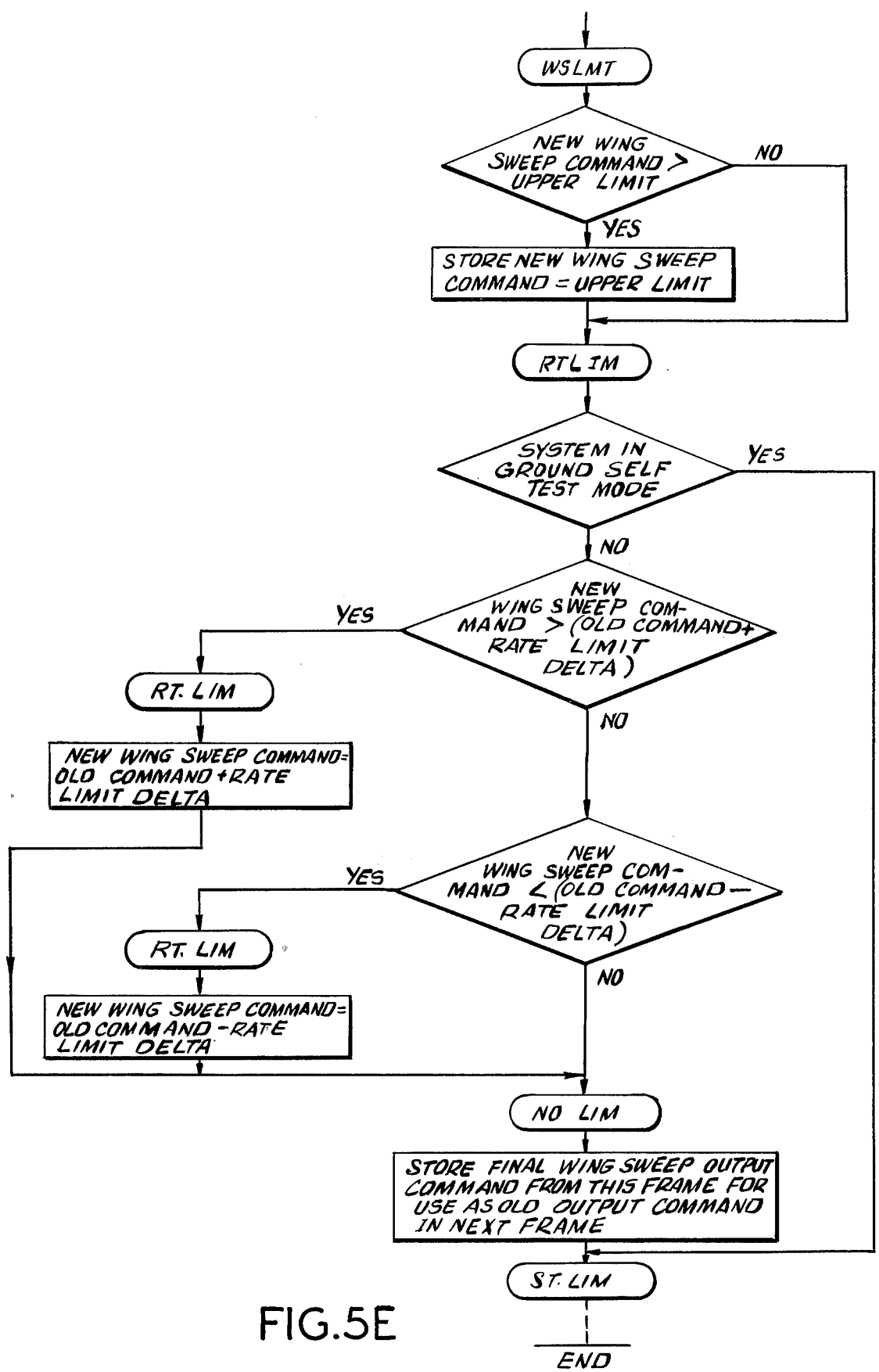

Referring to FIG. 4, the various modes of operation and their interaction are illustrated. The manual and automatic modes of operation are electronically interlocked so that switching from the manual to the automatic mode is performed automatically within the computer 14. The computer recognizes the intersection of the wing sweep angle achieved with the manual mode and the wing sweep schedule selected. Upon intersection, switchover to the automatic mode occurs.

Switching from the manual to the automatic mode occurs at all points along the line 150 when the position command in the manual mode equals the wing position schedule computed by the limiting circuitry 94. An arbitrary point P in the manual mode of operation may intercept the computed wing position from the limiting circuitry 94, e.g., at points A, B, and C. Control of the sweep position is then automatically switched from the manual to the automatic mode within the computer 14. Return to the manual mode is effected when the pilot commands a more aft wing position than the wing position schedule established by the limiting circuitry 94.

In operation, a command signal is transmitted from the control button 36 to the computer 14 to activate the manual or automatic mode switch 90. The resulting output signal from the computer 14 drives the control drive servo 40 which acts through the differential gear means 104 to activate servo valve 42 which controls hydraulic motors 44 and 46 which act through gear trains 52 and 54 to rotate screw jacks 48 and 50 for positioning the wings 24 and 26 at the proper sweep angle.

The automatic control may be overridden by the pilot, as desired. Automatic control of the wing sweep angle is automatically resumed when the manually selected wing sweep angle corresponds to the sweep angle provided at that speed and altitude by the computer 14. The emergency control mode is provided to bypass the manual and automatic control by the computer 14 to provide a reliable back-up system. The bomb control mode provides a minimum wing sweep angle of 55° to ensure structural safety of the wings during ground attack maneuvers whih expose the aircraft to the greatest loads. In the Mach range where the wing sweep schedule computes a wing position greater than 55°, the bomb mode command will follow the schedule without switching over to the automatic mode of operation. The small change in wing position in the bomb mode leads to minimal aircraft trim change, thus reducing the possibility of introducing weapon release errors.

Thus, from the foregoing description, it is apparent that the present invention enables the sweep angle of the wings of an aircraft to be automatically and manually controlled between about 20° and about 68° to optimize maneuverability and performance.

It should be understood by those skilled in the art that various modifications may be made in the present invention without departing from the spirit and scope thereof as described in the specification and defined in the appended claims.

APPENDIX A

-continued

| CARD | IN | | | | | DISP | XR | OP | CO | INST |
|---|---|---|---|---|---|---|---|---|---|---|
| 1484 | 156. | | STA | BACKK | | 2451 | 00 | STA | 05 | 3063 |
| 1485 | 1588 | | TRA | SYNC. | CALL SYNCRO | 5105 | 00 | TRA | 13 | 3064 |
| 1486 | 1589 | SYR2. | CLA | ZOUT1 | | 2442 | 00 | CLA | 00 | 3065 |
| 1487 | 1590 | | STA | OUT41Y | MOVE SYNCRO OUTPUTS | 0473 | 00 | STA | 05 | 3066 |
| 1488 | 1591 | | CLA | ZOUT2 | | 2446 | 00 | CLA | 00 | 3067 |
| 1489 | 1592 | | STA | OUT41X | | 0467 | 00 | STA | 05 | 3070 |

*
*
*******************************************WING SWEEP LIMITS
*
*

| 1495 | 1593 | | CLA | DEG68. | SET UPPER LIMIT TO 68 DEGREES | 6046 | 00 | CLA | 00 | 3071 |
|---|---|---|---|---|---|---|---|---|---|---|
| 1496 | 1594 | | STA | UPLIM | | 2443 | 00 | STA | 05 | 3072 |
| 1497 | 1595 | | IND | ROPTSS | 'INDXXX INPUT PS TEMP. | 2451 | 00 | IND | 17 | 3073 |
| 1498 | 1596 | | OUD | MUXA3 | OUDXXX ADDRESS PT TEMP. INPUT | 5066 | 00 | OUD | 16 | 3074 |
| 1499 | 1597 | | LAD | A 16 | LADXXX | 0020 | 00 | LAD | 20 | 3075 |
| 1500 | 1598 | | CLA | DISCIA | DEVELOP WING SWEEP LIMITS DISCRETES | 2412 | 00 | CLA | 00 | 3076 |
| 1501 | 1599 | | AND | I10A06 | ARE D7 AND D23 ZERO | 5320 | 00 | AND | 06 | 3077 |
| 1502 | 1600 | | TRE | LIM.20 | YES. W.S. IS LIMITED TO 20 DEG. | 3116 | 00 | TRE | 12 | 3100 |
| * | | | | | NO..W.S. NOT LIMITED TO 20 DEGREES | | | | | |
| 1504 | 1601 | | CLA | DISCIA | BEGIN TEST FOR 50 DEG. LIMIT | 2412 | 00 | CLA | 00 | 3101 |
| 1505 | 1602 | | AND | I11A05 | ARE D6 AND D12 ZERO | 5321 | 00 | AND | 06 | 3102 |
| 1506 | 1603 | | TRE | LIM.50 | YES. W.S. LIMITED TO 50 DEG. | 3120 | 00 | TRE | 12 | 3103 |
| 1507 | 1604 | | CLA | DISCIA | BRING IN D5. BEGIN CHECK FOR BOMB MODE | 2412 | 00 | CLA | 00 | 3104 |
| 1508 | 1605 | | AND | I09A04 | CHECK D10 AND D5 | 5346 | 00 | AND | 06 | 3105 |
| 1509 | 1606 | | SUB | I04-04 | AUTO AND BOMB DISCRETES | 5335 | 00 | SUB | 02 | 3106 |
| 1510 | 1607 | | STA | BMBFLG | IF BOMB MODE. BMBFLG = 0 | 2446 | 00 | STA | 05 | 3107 |
| 1511 | 1608 | NO.BMB | CLA | DISCIA | CHECK FOR | 2412 | 00 | CLA | 00 | 3110 |
| 1512 | 1609 | | AND | I08-08 | MANUAL AFT DISCRETE | 5330 | 00 | AND | 06 | 3111 |
| 1513 | 1610 | | TRE | N.MAFT | XFER IF NOT MAN AFT | 3123 | 00 | TRE | 12 | 3112 |
| 1514 | 1611 | | CLA | DEG68. | OTHERWISE SET | 6046 | 00 | CLA | 00 | 3113 |
| 1515 | 1612 | | STA | OUT40A | OUTPUT COMMAND=68 DEG | 0476 | 00 | STA | 05 | 3114 |
| 1516 | 1613 | | TRA | DELMNL | AND GO TO SET MANUAL RATE LIMIT | 3160 | 00 | TRA | 13 | 3115 |
| 1517 | 1614 | LIM.20 | CLA | DEG20. | LIMIT W S TO 20 DEG | 6042 | 00 | CLA | 00 | 3116 |
| 1518 | 1615 | | TRA | HERE +0002 | | 3121 | 00 | TRA | 13 | 3117 |
| 1519 | 1616 | LIM.50 | CLA | DEG50. | LIMIT W S TO 50 DEG | 6044 | 00 | CLA | 00 | 3120 |
| 1520 | 1617 | | STA | UPLIM | SET UPPER LIMIT TO 50 DEGREES | 2443 | 00 | STA | 05 | 3121 |
| 1521 | 1618 | | TRA | NO.BMB | RETURN TO RESET BOMB MODE (D018) | 3110 | 00 | TRA | 13 | 3122 |
| 1522 | 1619 | N.MAFT | CLA | DISCOB | COME HERE IF NOT MANUAL AFT | 2422 | 00 | CLA | 00 | 3123 |
| 1523 | 1620 | | AND | I08-08 | CHECK FOR AUTO MODE | 5330 | 00 | AND | 06 | 3124 |
| 1524 | 1621 | | TRE | HERE +0002 | IF NOT AUTO GO CK WSC>WSM | 3127 | 00 | TRE | 12 | 3125 |
| 1525 | 1622 | | TRA | SET54 | OTHERWISE GO SET AUTO MODE | 3132 | 00 | TRA | 13 | 3126 |
| 1526 | 1623 | | CLA | WSM | OTHERWISE CHECK FOR | 2465 | 00 | CLA | 00 | 3127 |
| 1527 | 1624 | | SUB | WSRAS | SCHEDULE > COMMAND | 2475 | 00 | SUB | 02 | 3130 |
| 1528 | 1625 | | TRM | CK.AUT | IF COMMAND AFT OF SCHED GO CK AUTO | 3144 | 00 | TRM | 11 | 3131 |
| 1529 | 1626 | SET54 | CLA | DISCOB | | 2422 | 00 | CLA | 00 | 3132 |
| 1530 | 1627 | | AND | I12-12 | WAS AUTO MODE DISC. SET IN PREVIOUS FRAME | 6235 | 00 | AND | 06 | 3133 |
| 1531 | 1628 | | TRE | HERE +0002 | NO. | 3136 | 00 | TRE | 12 | 3134 |
| 1532 | 1629 | | TRA | CK.BMB | YES. GO CHECK BOMB MODE | 3170 | 00 | TRA | 13 | 3135 |
| 1533 | 1630 | | ZAC | | CLEAR | 0000 | 00 | ZAC | 36 | 3136 |
| 1534 | 1631 | | STA | WSTMR | 40A/WS ACTUATOR FAILURE TIMER | 0423 | 00 | STA | 05 | 3137 |
| 1535 | 1632 | | CLA | DISCOB | AND | 2422 | 00 | CLA | 00 | 3140 |
| 1536 | 1633 | | OR | I12A08 | SET AUTO MODE AND OUT54A = 1 | 5347 | 00 | OR | 07 | 3141 |
| 1537 | 1634 | | STA | DISCOB | | 2422 | 00 | STA | 05 | 3142 |
| 1538 | 1635 | | TRA | CK.BMB | OTHERWISE GO CHECK BOMB MODE | 3170 | 00 | TRA | 13 | 3143 |

| CARD | IN | | | | | DISP | XR | OP | CO | INST |
|---|---|---|---|---|---|---|---|---|---|---|
| 1539 | 1636 | CK.AUT | CLA | DISCTA | | 2412 | 00 | CLA | 00 | 3144 |
| 1540 | 1637 | | AND | I09-09 | CHECK FOR AUTO DISCRETE | 5336 | 00 | AND | 06 | 3145 |
| 1541 | 1638 | | TRE | CK.FWD | IF NOT AUTO GO CK FWD MAN DISC | 3152 | 00 | TRE | 12 | 3146 |
| 1542 | 1639 | | CLA | DISCOB | OTHERWISE | 2422 | 00 | CLA | 00 | 3147 |
| 1543 | 1640 | | TRA | SET54 | GO SET OUTPUT 54 = 1 | 3132 | 00 | TRA | 13 | 3150 |
| 1544 | 1641 | | SCK | | SUMCHK SUM CHECK AUTO=DATA 5 | 0000 | 00 | SCK | 00 | 3151 |
| 1545 | 1642 | CK.FWD | CLA | DISCIA | CHECK FOR FWD MANUAL DISCRETE | 2412 | 00 | CLA | 00 | 3152 |
| 1546 | 1643 | | AND | I07-07 | | 5327 | 00 | AND | 06 | 3153 |
| 1547 | 1644 | | SUB | I07-07 | IF FORWARD MANUAL | 5327 | 00 | SUB | 02 | 3154 |
| 1548 | 1645 | | TRE | DELMNL | GO SET MANUAL RATE LIMIT | 3166 | 00 | TRE | 12 | 3155 |
| 1549 | 1646 | | CLA | WSPAS | OTHERWISE MAKE NEW | 2475 | 00 | CLA | 00 | 3156 |
| 1550 | 1647 | | STA | OUT40A | COMMAND = LAST OUTPUT | 0476 | 00 | STA | 05 | 3157 |
| 1551 | 1648 | DELMNL | CLA | DELMAN | SET RATE LIMIT | 6633 | 00 | CLA | 00 | 3160 |
| 1552 | 1649 | | STA | DELTA | TO 8.9 IN/SEC (MANUAL) | 2402 | 00 | STA | 05 | 3161 |
| 1553 | 1650 | | CLA | DISCIA | SET FLAG FOR | 2412 | 00 | CLA | 00 | 3162 |
| 1554 | 1651 | | OR | I19-19 | WS RATE = 8.9 IN/SEC | 5342 | 00 | OR | 07 | 3163 |
| 1555 | 1652 | | STA | DISCIA | | 2412 | 00 | STA | 05 | 3164 |
| 1556 | 1653 | | CLA | DISCOB | | 2422 | 00 | CLA | 00 | 3165 |
| 1557 | 1654 | | AND | 012A08 | RESET OUTPUT 54A = 0 | 5375 | 00 | AND | 06 | 3166 |
| 1558 | 1655 | | STA | DISCOB | | 2422 | 00 | STA | 05 | 3167 |
| * | | | | | CHECK FOR BOMB MODE | | | | | |
| 1560 | 1656 | CK.BMB | CLA | BMBFLG | | 2446 | 00 | CLA | 00 | 3170 |
| 1561 | 1657 | | TRE | HERE +0002 | IF BOMB MODE XFER | 3173 | 00 | TRE | 12 | 3171 |
| 1562 | 1658 | | TRA | WSLMT | OTHERWISE GO TO WING SWEEP LIMITS | 3217 | 00 | TRA | 13 | 3172 |
| 1563 | 1659 | | CLA | DISCOB | | 2422 | 00 | CLA | 00 | 3173 |
| 1564 | 1660 | | AND | I08-08 | CHECK FOR AUTO MODE | 5330 | 00 | AND | 06 | 3174 |
| 1565 | 1661 | | TRE | NT.AUT | XFER IF NOT ON AUTO SCHEDULE | 3202 | 00 | TRE | 12 | 3175 |
| 1566 | 1662 | | CLA | DEG55. | OTHERWISE CHECK FOR SCHED AFT OF 55 DEG | 6045 | 00 | CLA | 00 | 3176 |
| 1567 | 1663 | | SUB | WSM | | 2465 | 00 | SUB | 02 | 3177 |
| 1568 | 1664 | | TRM | RSET54 | XFER IF WSM GT 55 DEG | 3212 | 00 | TRM | 11 | 3200 |
| 1569 | 1665 | | TRA | SET55 | XTHERWISE GO SET OUT40A = 0 | 3205 | 00 | TRA | 13 | 3201 |
| 1570 | 1666 | NT.AUT | CLA | DEG55. | NOT AUTO MODE CHECK | 6045 | 00 | CLA | 00 | 3202 |
| 1571 | 1667 | | SUB | WSRAS | TO SEE IF COMMAND IS GT 55 DEG | 2475 | 00 | SUB | 02 | 3203 |
| 1572 | 1668 | | TRM | RSET54 | WSRAS GT 55 DEG. USE WSRAS | 3212 | 00 | TRM | 11 | 3204 |
| 1573 | 1669 | SET55 | CLA | DEG55. | | 6045 | 00 | CLA | 00 | 3205 |
| 1574 | 1670 | | STA | OUT40A | MAKE OUTPUT 40A = 55 DEG | 0476 | 00 | STA | 05 | 3206 |
| 1575 | 1671 | | CLA | DISCOB | | 2422 | 00 | CLA | 00 | 3207 |
| 1576 | 1672 | | AND | D08-08 | SET NOT AUTO MODE | 5370 | 00 | AND | 06 | 3210 |
| 1577 | 1673 | | STA | DISCOB | | 2422 | 00 | STA | 05 | 3211 |
| 1578 | 1674 | RSET54 | CLA | DISCOB | | 2422 | 00 | CLA | 00 | 3212 |
| 1579 | 1675 | | AND | 012-12 | SET OUTPUT 54A = MANUAL | 5571 | 00 | AND | 06 | 3213 |
| 1580 | 1676 | | STA | DISCOB | | 2422 | 00 | STA | 05 | 3214 |
| 1581 | 1677 | | CLA | DELAUT | SET RATE LIMIT DELTA TO AUTO | 6632 | 00 | CLA | 00 | 3215 |
| 1582 | 1678 | | STA | DELTA | | 2402 | 00 | STA | 05 | 3216 |
| * | | | | | ***** WS LIMITS SECTION ******* | | | | | |
| 1584 | 1679 | WSLMT | CLA | OUT40A | | 0476 | 00 | CLA | 00 | 3217 |
| 1585 | 1680 | | SUB | UPLIM | IF HIGH LIMIT > OUT40A | 2443 | 00 | SUB | 02 | 3220 |
| 1586 | 1681 | | TRM | RTLIM | GO TO RATE LIMIT | 3224 | 00 | TRM | 11 | 3221 |
| 1587 | 1682 | | CLA | UPLIM | OTHERWISE MAKE OUT40A = HIGH LIMIT | 2443 | 00 | CLA | 00 | 3222 |
| 1588 | 1683 | | STA | OUT40A | | 0476 | 00 | STA | 05 | 3223 |
| * | | | | | | | | | | |
| 1590 | 1684 | RTLIM | CLA | DISCOB | IF SELF TEST 1 OR 2 | 2422 | 00 | CLA | 00 | 3224 |
| 1591 | 1685 | | AND | I09-09 | | 5336 | 00 | AND | 06 | 3225 |
| 1592 | 1686 | | TRE | SK.LIM | SKIP WS RATE LIMIT | 3243 | 00 | TRE | 12 | 3226 |
| | | | | | WS RATE LIMIT | | | | | |

-continued

| CARD | IN | | | | | DISP | XR | OP | CC | INST |
|---|---|---|---|---|---|---|---|---|---|---|
| 1594 | 1687 | | CLA | WSRAS | OLD COMMAND (R) | 2475 | 00 | CLA | 00 | 3227 |
| 1595 | 1688 | | ADD | DELTA | R+A | 2402 | 00 | ADD | 01 | 3230 |
| 1596 | 1689 | | SUB | OUT40A | (R+A)-OUT40A | 0476 | 00 | SUB | 02 | 3231 |
| 1597 | 1690 | | TRM | R.LIM | XFER IF OUT40A>(R+A) | 3237 | 00 | TRM | 11 | 3232 |
| 1598 | 1691 | | CLA | WSRAS | OTHERWISE CHECK LO LIMIT | 2475 | 00 | CLA | 00 | 3233 |
| 1599 | 1692 | | SUB | DELTA | R+A | 2402 | 00 | SUB | 02 | 3234 |
| 1600 | 1693 | | SUB | OUT40A | (R-A)-OUT40A | 0476 | 00 | SUB | 02 | 3235 |
| 1601 | 1694 | | TRM | NO.LIM | XFER IF OUT40A>(R-A) | 3241 | 00 | TRM | 11 | 3236 |
| 1602 | 1695 | R.LIM | ADD | OUT40A | (R+A) OR (R-A) | 0476 | 00 | ADD | 01 | 3237 |
| 1603 | 1696 | | STA | OUT40A | OUT40A = | 0476 | 00 | STA | 05 | 3240 |
| 1604 | 1697 | NO.LIM | CLA | OUT40A | TAKE CORRECTED VALUE | 0476 | 00 | CLA | 00 | 3241 |
| 1605 | 1698 | | STA | WSRAS | AS NEXT VALUE FOR RAS MEMORY | 2475 | 00 | STA | 05 | 3242 |

*
*
*********************************MANEUVER FLAP CONTROL
*
*

| | | | | | | | | | | |
|---|---|---|---|---|---|---|---|---|---|---|
| 1611 | 1699 | SK.LIM | CLA | MACH | BRING IN MACH | 0446 | 00 | CLA | 00 | 3243 |
| 1612 | 1700 | | LDX 1 | BALNMF | | 1504 | 01 | LDX | 50 | 3244 |
| 1613 | 1701 | | TRA | LINNT. | | 4776 | 00 | TRA | 13 | 3245 |
| 1614 | 1702 | .LRMF. | MPY | MF500 | RESCALE 500 PSF/600 PSF | 6333 | 00 | MPY | 03 | 3246 |
| 1615 | 1703 | | STA | X1 | QLIM | 2402 | 00 | STA | 05 | 3247 |
| 1616 | 1704 | | LDX 1 | BALM31 | LOAD INDEX REG. | 2223 | 01 | LDX | 50 | 3250 |
| 1617 | 1705 | | CLA | MACH | BRING IN MACH | 0446 | 00 | CLA | 00 | 3251 |
| 1618 | 1706 | | SUB | MF95 | FIT DELTA Q | 6330 | 00 | SUB | 02 | 3252 |
| 1619 | 1707 | | TRA | LIMIT. | CURVE AND | 5061 | 00 | TRA | 13 | 3253 |
| 1620 | 1708 | LMR31. | DIV | MF50 | SCALE TO 600 PSF | 6327 | 00 | DIV | 04 | 3254 |
| 1621 | 1709 | | SUB | X1 | FORM DELTA Q - QLIM | 2442 | 00 | SUB | 02 | 3255 |
| 1622 | 1710 | | STA | X1 | TEMP. STORAGE | 2402 | 00 | STA | 05 | 3256 |
| 1623 | 1711 | | LDX 1 | BALM29 | LOAD INDEX REG. | 2132 | 01 | LDX | 50 | 3257 |
| 1624 | 1712 | | CLA | QA | BRING IN QA | 2400 | 00 | CLA | 00 | 3260 |
| 1625 | 1713 | | TRA | LIMIT. | LIMIT | 5061 | 00 | TRA | 13 | 3261 |
| 1626 | 1714 | LMR29. | OUD | OUT20 | OUDXXX OUTPUT 20 | 2453 | 00 | OUD | 16 | 3262 |
| 1627 | 1715 | | LAD | A 160 | LADXXX | 0240 | 00 | LAD | 20 | 3263 |
| 1628 | 1716 | MUXA7 | FOS | 0 0366 | EOSXXX | 0366 | 00 | FOS | 15 | 3264 |
| 1629 | 1717 | | DIV | MF125 | SCALE TO 600 PSF | 6331 | 00 | DIV | 04 | 3265 |
| 1630 | 1718 | | IND | RDRTST | INPUT PT TEMP. INDXXX | 2402 | 00 | IND | 17 | 3266 |
| 1631 | 1719 | | OUD | MUXA4 | ADDRESS PS SLOPE INPUT OUDXXX | 0243 | 00 | OUD | 16 | 3267 |
| 1632 | 1720 | | LAD | A 160 | LADXXX | 0240 | 00 | LAD | 20 | 3270 |
| 1633 | 1721 | | ADD | MF10 | (QA - 100 PSF)/600 PSF | 6324 | 00 | ADD | 01 | 3271 |
| 1634 | 1722 | | LDX 1 | BALM30 | LOAD INDEX REG. | 2214 | 01 | LDX | 50 | 3272 |
| 1635 | 1723 | | ADD | X1 | FORM QA - QLIM + DELTA Q - 100 PSF | 2442 | 00 | ADD | 01 | 3273 |
| 1636 | 1724 | | TRA | LIMIT. | LIMIT | 5061 | 00 | TRA | 13 | 3274 |
| 1637 | 1725 | LMR30. | DIV | MF5/6 | SCALE 600PSF/60DEG*50DEG/60DEG | 6323 | 00 | DIV | 04 | 3275 |
| 1638 | 1726 | | STA | X1 | THIS IS OUTPUT .........MFX1A | 2442 | 00 | STA | 05 | 3276 |
| 1639 | 1727 | | STA | DLFLIM | SAVE FOR LATER COMPUTATION | 2445 | 00 | STA | 05 | 3277 |
| 1640 | 1728 | | CLA | FLGST | YES. BRING IN DP15 | 2456 | 00 | CLA | 00 | 3300 |
| 1641 | 1729 | | AND | I13-13 | IS RESET TRUE? | 5337 | 00 | AND | 06 | 3301 |
| 1642 | 1730 | | TRE | MFF. | YES: GO CHECK MACH | 3305 | 00 | TRE | 12 | 3302 |
| 1643 | 1731 | | CLA | MFRAS1 | NO..THUMBWHEEL CONTROLS M.F. OUTPUT | 2460 | 00 | CLA | 00 | 3303 |
| 1644 | 1732 | | TRA | MFR. | | 3317 | 00 | TRA | 13 | 3304 |
| 1645 | 1733 | MFF. | CLA | MACH | BRING IN MACH | 0446 | 00 | CLA | 00 | 3305 |
| 1646 | 1734 | | SUB | MF1/4 | IS MACH .GT. ONE | 6320 | 00 | SUB | 02 | 3306 |
| 1647 | 1735 | | TRM | HERE +0005 | NO. GO BRING IN M.F. CDSA | 3314 | 00 | TRM | 11 | 3307 |
| 1648 | 1736 | | CLA | GVACT2 | YES: CONTROL M.F. FROM RIGHT G.V.ACT | 2431 | 00 | CLA | 00 | 3310 |

What is claimed is:
1. A wing sweep control system for controlling the position of the wings of an aircraft, comprising:
a digital computer;
detector means for providing input signals representative of aircraft speed and altitude to said digital computer, said digital computer selecting a predetermined wing sweep angle within a given range of wing sweep angles in accordance with aircraft speed and altitude;
control means responsive to output signals from said computer;
actuator means mechanically coupled to the wings of the aircraft for positioning the wings in response to output signals from said control means; and
coupling means for synchronizing the movement of the wings.
2. The system of claim 1 including:
means for providing feedback from said actuator means to said control means.
3. The system of claim 1 including:
means for providing feedback from said actuator means to said digital computer.
4. The system of claim 1 wherein:
said control means includes servo drive control means coupled to a control linkage.
5. The system of claim 4 including:
movable stop means for establishing the upper limit of the movement of said control linkage of said control means at about 68°.
6. The system of claim 1 wherein:
said actuator means includes a pair of screwjacks and a pair of hydraulic motors mechanically coupled to said screwjacks through gear means.
7. The system of claim 1 wherein:
said detector means includes pitot static members.
8. The system of claim 1 in which the aircraft includes maneuvers flaps, including:
second actuator means coupled to the maneuver flaps of the aircraft;
said control means being coupled to said second actuator means;
means for providing feedback to said control means from said second actuator means.
9. The system of claim 1 in which the aircraft includes auxiliary flaps, including:
third actuator means coupled to the auxiliary flaps of the aircraft;
said control means being coupled to said third actuator means.
10. The system of claim 1 including:
logic circuitry for detecting malfunctions in said digital computer, said control means, and said actuator means.

11. The system of claim 1 including:
means for bypassing said digital computer to manually activate said control means.

12. The system of claim 1 wherein:
said digital computer provides automatic control of the position of the wings of the aircraft in response to output signals from a selector circuit.

13. The system of claim 12 including:
means for manually controlling said digital computer to position the wings of the aircraft in response to commands from a pilot;
said digital computer returning the wings to automatic control when the wing position manually set by the pilot coincides with the wing position automatically determined by said digital computer.

14. The system of claim 1 wherein said control means includes:
a servo controller to receive output signals from said digital computer;
servo drive control means coupled to said servo controller; and
link means responsive to said servo drive control means.

15. The system of claim 14 wherein:
said link means is coupled to said actuator means to receive feedback therefrom.

16. The system of claim 14 wherein:
said actuator means includes servo valve means;
said link means is mechanically coupled to said servo valve means.

17. The system of claim 14 including:
means for normally providing an upper limit on the movement of said link means to establish a maximum aft wing position.

18. A wing sweep control system for controlling the position of the wings of an aircraft, comprising:
means for determining the speed and altitude of the aircraft;
computer means for aiding in automatically positioning the wings in response to the speed and altitude of the aircraft;
means for manually determining the wing position; and
means for returning control of the wing position from said manual means to said automatic positioning means when there is a correspondence in the wing position determined by said manual control means and said automatic positioning means.

19. The system of claim 18 including:
means for indicating malfunctions in said automatic positioning means.

20. A wing sweep control system for controlling the position of the wings of an aircraft, comprising:
a digital computer;
detector means for providing input signals representative of aircraft speed and altitude to said digital computer;
control means responsive to output signals from said digital computer;
actuator means mechanically coupled to the wings of the aircraft for positioning the wings in response to said control means, said control means being activated in response to signals from said digital computer to control said actuator means for providing a wing sweep angle of about 20° to about 68°, dependent upon aircraft speed and altitude.

21. A wing sweep control system for controlling the position of the wings of an aircraft, comprising:
a digital computer;
detector means for providing input signals representative of aircraft speed and altitude to said digital computer;
control means responsive to output signals from said digital computer to provide upper and lower wing sweep angle limits;
actuator means mechanically coupled to the wings of the aircraft for positioning the wings in response to said control means;
means for aynchronizing the movement of the wings; and
means for overriding the upper wing sweep angle limit established by said digital computer and said control means.

22. A wing sweep control system for controlling the position of the wings of an aircraft, comprising:
a digital computer;
detector means for providing input signals representative of aircraft speed and altitude to said digital computer;
control means responsive to output signals from said digital computer, said computer providing an output signal to said control means for establishing a minimum sweep angle of about 55° during bombing;
actuator means mechanically coupled to the wings of the aircraft for positioning the wings in response to said control means; and means for synchronizing the movement of the wings.

23. A wing sweep control system for controlling the position of the wings of an aircraft, comprising:
a digital computer;
detector means for providing input signal representative of aircraft speed and altitude to said digital computer;
means for selecting one of a plurality of preprogrammed computer wing sweep angle position schedules dependent upon aircraft speed and altitude;
control means responsive to output signals from said digital computer;
actuator means mechanically coupled to the wings of the aircraft for positioning the wings in response to said control means; and
means for synchronizing the movement of the wings.

24. A wing sweep control system for controlling the position of the wings of an aircraft, comprising:
a digital computer;
detector means for providing input signals representative of aircraft speed and altitude to said digital computer;
control means responsive to output signals from said digital computer, said control means including a servo controller to receive output signals from said computer, servo drive control means coupled to said servo controller, and link means responsive to said servo drive control means;
emergency actuating means coupled to said link means for arresting control of said link means from said servo drive control means upon the application of sufficient force on said link means from said emergency actuating means;
actuating means mechanically coupled to the wings of the aircraft for positioning the wings in response to said control means; and
means for synchronizing the movement of the wings.

25. A wing sweep control system for controlling the position of the wings of an aircraft, comprising:
- means for determining the speed and altitude of the aircraft;
- means for automatically positioning the wings in response to the speed and altitude of the aircraft to provide a wing sweep range of about 20° to about 68°;
- means for manually determining the wing position; and
- means for returning control of the wing position from said manual means to said automatic positioning means when there is a correspondence in the wing position determined by said manual control means and said automatic positioning means.

26. A wing sweep control system for controlling the position of the wings of an aircraft, comprising:
- means for determining the speed and altitude of the aircraft;
- means for automatically positioning the wings in response to the speed and altitude of the aircraft;
- means for manually determining the wing position;
- means for returning control of the wing position from said manual means to said automatic positioning means when there is a correspondence in the wing position determined by said manual control means and said automatic positiong means; and
- oversweep means for overriding the most aft wing position provided by said automatic positioning means.

27. A wing sweep control system for controlling the position of the wings of an aircraft, comprising:
- means for determining the speed and altitude of the aircraft;
- means for automatically positioning the wings in response to the speed and altitude of the aircraft to maintain a minimum wing position of about 55° during bombing;
- means for manually determining the wing position; and
- means for returning control of the wing position from said manual means to said automatic positioning means when there is a correspondence in the wing position determined by said manual control means and said automatic positioning means.

28. A wing sweep control system for controlling the position of the wings of an aircraft, comprising:
- means for determining the speed and altitude of the aircraft;
- means for automatically positioning the wings in response to the speed and altitude of the aircraft, said automatic positioning means including a plurality of predetermined wing positions dependent upon aircraft speed and altitude;
- means for manually determining the wing position; and
- means for returning control of the wing position from said manual means to said automatic positioning means when there is a correspondence in the wing position determined by said manual control means and said automatic positioning means.

29. A wing sweep control system for controlling the position of the wings of an aircraft, in which the wings have maneuver flaps, comprising:
- means for determining the speed and altitude of the aircraft;
- means for automatically positioning the wings in response to the speed and altitude of the aircraft;
- means for manually determining the wing position;
- means for returning control of the wing position from said manual means to said automatic positioning means when there is a correspondence in the wing position determined by said manual control means and said automatic positioning means;
- means for activating the maneuver flaps; and
- means electrically coupled to said automatic positioning means for aignaling said automatic positioning means to limit the aft position of the wings to about 50° when the maneuver flaps are extended.

30. A wing sweep control system for controlling the position of the wings of an aircraft in which the wings have auxiliary flaps, comprising:
- means for determining the speed and altitude of the aircraft;
- means for automatically positioning the wings in response to the speed and altitude of the aircraft;
- means for manually determining the wing position;
- means for returning control of the wing position from said manual means to said automatic positioning means when there is a correspondence in the wing position determined by said manual control means and said automatic positioning means;
- means for activating the auxiliary flaps;
- means electrically coupled to said automatic positioning means for signaling said automatic positioning means to limit the forward position of the wings to about 20° when the auxiliary flaps are extended.

* * * * *